United States Patent Office 2,861,002
Patented Nov. 18, 1958

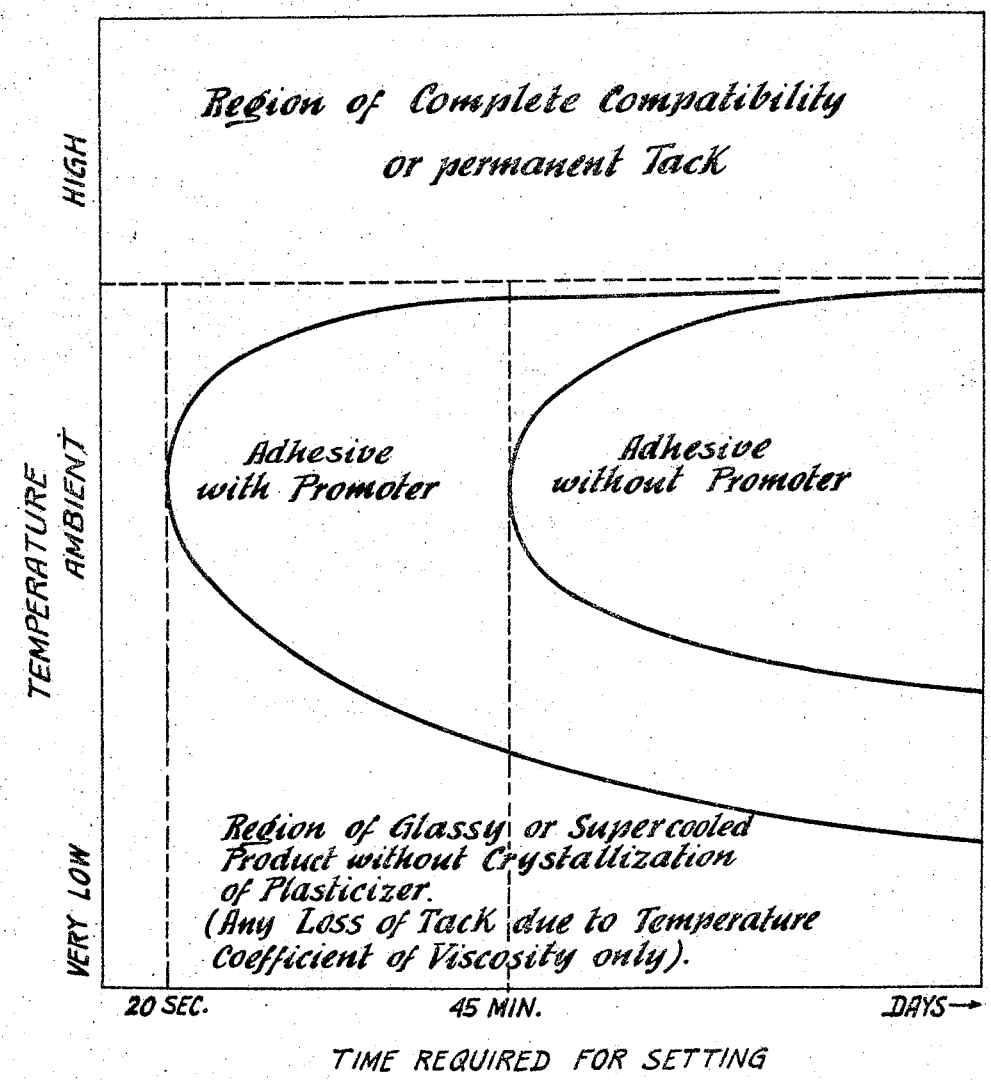

2,861,002

HOT MELT RESINOUS ADHESIVE COMPOSITION

Richard K. Britton, Sidney, N. Y., assignor to The Borden Company, New York, N. Y., a corporation of New Jersey Application February 9, 1956, Serial No. 564,398

5 Claims. (Cl. 106—177)

This invention relates to a hot melt adhesive composition of controlled, dependable setting action as the composition cools through a narrow range of temperature below the elevated temperature at which it has a viscosity sufficiently low for application.

My adhesive composition is useful in many operations in which an adhesive composition is applied to a surface to be adhered to another surface. An example is the plying of paper and aluminum foil. An adhesive is softened by heat just before or at the time one adhesively coated surface is pressed against another. The ply so composited is then cooled, to cause hardening or setting of the adhesive. Other examples are the use as the cement in the side seams of metal cans, application of labels to cans, and sealing of the flaps of cartons. The hardening or setting of the composition is caused by the separation of a plasticizer as the adhesive cools or within a limited controlled time of cooling.

In such use there is experienced variation in the behavior of the heat activated adhesives. The usual type of hot melt adhesive undergoes such rapid increase of viscosity as to set up objectionably rapidly, as the temperature begins to fall. The type disclosed in U. S. Patent 2,608,543 to Wiswell, on the other hand, is said (Table 4) to set up in periods of time up to 9 days for various compositions. Such delay is considered to be due in large part to supercooling without the prompt separation of plasticizer in excess of solubility proportions, as the temperature falls. In any case, the attendant long period of tackiness causes "blocking," as in the continuous printing of adhesive on carton stock without promptly sealing the cartons.

The present invention provides a process and product that delays the set for the few seconds or more required for the application and sealing but avoids long delay in setting such as would interfere with continuous assembly-line type of use.

Briefly stated, the invention comprises an anhydrous combination of a crystalline solid, an adhesive, and an admixed setting promoter. The said solid, when molten, serves as a viscosity reducing agent (plasticizer) for the adhesive and separates therefrom when and if crystallization from the adhesive occurs on cooling. The setting promoter provides extensive surface and closely spaced undissolved solid particles throughout the melt at the time of the cooling and separation.

With such a composition, I obtain briefly delayed, dependable hardening or firming of the adhesive composition within a limited time after cooling below the temperature of application of the adhesive. Thus, a representative one of my adhesive compositions, when applied to flaps of cartons at a temperature of 102° C. and allowed to cool, sets to a firm bond in about 30 seconds after the coating is completed. This delay is sufficient to permit the sealing of a carton by application of pressure only, using cold jaws without reheating or maintaining the adhesive film at a high temperature after application. Sealing to a cold surface during the delay period is also possible.

The attached drawing is an idealized presentation of the effect of the setting promoter on the length of the delay period before the adhesive sets, after the hot application of the adhesive to a surface. The data for the setting times, that is, the amount of offset to the right of the X-axis of the figure, is from Examples 1 and 2 later herein.

As to materials, there is used a solid potentially adhesive material that, at elevated temperatures of my composition, becomes a tacky or sticky liquid and a solvent for or solute in the plasticizer in practically all proportions. Examples that illustrate the class of adhesives that are useful for the present purpose are the resins such as polyvinyl acetate resin (Gelva V-60 and Lemac No. 15), its copolymer with crotonic acid (Gelva C-3-V-20), thermoplastic polyamides of polymerized unsaturated $C_{12}$-$C_{20}$ fatty acids, such as dilinoleic acid with aliphatic amines such as ethylene diamine (G. M. Resin No. 90), polyvinyl chloride, and polymethyl methacrylate. Ethyl cellulose and other like alkyl ethers of cellulose are potential adhesives that dissolve in the melted plasticizer and so become active adhesives.

The plasticizer used should be a crystalline solid of ordinary (normal) temperatures, should be substantially non-volatile under conditions of use, and have a high temperature coefficient of solubility in the resin adhesive. The plasticizer is one that is soluble in large proportions, suitably practically infinitely, in the resin at the elevated temperature of application during use, and that separates from the resin when the temperature falls below a rather narrow range including the lowest temperature at which the whole composition must remain tacky during the sealing operation. Examples of plasticizers that meet these requirements are mixed o- and p-toluene sulfonamide (Santicizer No. 9), m-terphenyl, and diphenyl phosphate. When the composition is to be used as the side seam cement in metal cans, the plasticizer is one that, as used, melts at a temperature above that of sterilization of the cans, so that the seam cement preserves its bond during the sterilization.

My compositions are used without normally liquid dispersing media. Thus there are omitted such normally active volatile solvents as the lower alcohols, ketones, and esters and also non-solvent dispersing media of which water is an example.

The setting promoter to be used should be inorganic, inert chemically to the adhesive resin and plasticizer and the mixture thereof, and also insoluble therein. Clay, diatomaceous earth, and Santocel (silica gel dehydrated without collapse and then comminuted) and like mineral powders in finely divided, powder form are satisfactory. The presence of some crystalline material in the powder is considered advantageous.

To improve the uniformity of admixture and distribution of the powder throughout the whole composition, I suitably introduce a dispersing agent for the powder. This may be any agent known to be effective in improving the fineness of distribution of the selected powder in organic compounds of the class of those in the adhesive composition and known also to be chemically inert therewith. With clay, for example, I use organic alkaline dispersing agent such as any commercial alkanolamine, particularly mono-, di-, or triethanolamine.

Proportions may be varied within wide limits, in accordance with the viscosity or other property desired in the finished product. Thus the proportion of the plasticizer may be 25–500 parts for 100 of the resin. The proportion is so selected within this range that the plasticizer and resin form a single liquid phase at the temperature to which the composition is to be heated at the time of use.

The setting promoter is used in the proportion of 100%–200% of the weight of the resin adhesive.

The dispersing agent for the promoter powder is used in conventional proportions, as, for instance, 2–10 parts for 100 of the powder.

The invention will be further illustrated by description in connection with the following specific examples of the practice of it.

All proportions here and elsewhere herein are expressed as parts by weight.

A number of preparations using no setting promoter are included, to show by contrast the relatively long delay in setting as compared to the shorter delay for comparable compositions using the promoter.

In all these examples, the compounding procedure was essentially that of Example 1, except for the formulations shown.

*Example 1*

| Component: | Parts |
|---|---|
| Gelva C–3V–20 (resin) | 100 |
| Santicizer No. 9 (crystalline plasticizer) | 200 |
| Clay (setting promoter) | 133 |
| Triethanolamine (dispersant for the clay) | 5 |

The Santicizer No. 9 was melted in a heavy duty mixer such as a Baker-Perkins mixer, the Gelva C–3 resin added slowly and dissolved. Then triethanolamine was added. The clay was introduced slowly and stirred in. Heating to approximately 120° C. was required. The clay was very fine, the particles averaging 1 micron or less in size.
Application temperature: about 120° C.
Delay period: about 20 sec.

*Example 2*

| Component: | Parts |
|---|---|
| Gelva C–3V–20 (polyvinyl acetate copolymer) | 100 |
| Santicizer No. 9 | 150 |

No setting promoter.
Application temperature: 120° C.
Delay period: 45 min.

*Example 3*

| Component: | Parts |
|---|---|
| Gelva C–3V–20 | 100 |
| Santicizer No. 9 | 250 |

No setting promoter.
Application temperature: 110° C.
Delay period: 5 min.

Examples 2 and 3 show the effect of proportion of solid plasticizer.

Comparison with Example 1 shows in general the effect of omission of the setting promoter on the delay period.

*Example 4*

| Component: | Parts |
|---|---|
| Polyamide resin (GM No. 90) | 100 |
| Santicizer No. 9 | 67 |
| Clay | 100 |

Application temperature: about 110° C.
Delay period: about 60 sec.

*Example 5*

| Component: | Parts |
|---|---|
| Ethyl cellulose (N–7 C. P. grade) | 100 |
| Santicizer No. 9 | 250 |
| Clay | 200 |
| Phenyl-beta naphthylamine | 2 |

Application temperature: 100° C.
Delay period: 15 sec.

*Example 6*

| Component: | Parts |
|---|---|
| Gelva C–3V–20 | 100 |
| Meta terphenyl (crystalline plasticizer) | 200 |

No setting promoter.
Application temperature: 140° C.
Delay period: 10 min.

*Example 7*

| Component: | Parts |
|---|---|
| Gelva C–3V–20 | 100 |
| Santicizer No. 9 | 200 |
| Diatomaceous earth (Celite FC, setting promoter) | 150 |

Application temperature: 130° C.
Delay period: 30 sec.

*Example 8*

| Component: | Parts |
|---|---|
| Gelva V–15 (polyvinyl acetate) | 100 |
| Santicizer No. 9 | 200 |
| Clay | 180 |
| Titanium dioxide (pigment) | 20 |

Application temperature: 140° C.
Delay period: 30 sec.

*Example 9*

| Component: | Parts |
|---|---|
| Gelva V–60 | 100 |
| Santicizer No. 9 | 300 |

No setting promoter.
Application temperature: 150° C.
Delay period: 10 min.

*Example 10*

| Component: | Parts |
|---|---|
| Gelva V–60 | 100 |
| Diphenyl phthalate | 300 |

No setting promoter.
Application temperature: 140° C.
Delay period: 24 hrs.

*Example 11*

| Component: | Parts |
|---|---|
| Gelva C–3V–20 | 100 |
| Santicizer No. 9 | 233 |
| Clay | 200 |
| Triethanolamine | 5 |

Application temperature: 130° C.
Delay period: 30 sec.

Similar to Example 1 but with still more filler, no further advantage is shown.

*Example 12*

Aluminum foil and paper are laminated with a hot melt of the composition of Example 1. The foil or paper is coated with a thin film of the adhesive from an applicator roll and then joined in a subsequent pressure station to the other member. Due to the delayed setting action, heat need not be used at this pressure station as would be required if an ordinary hot melt adhesive with no delay were used.

*Example 13*

The application of such an adhesive for side-seaming metallic cans involves applying a molten adhesive to one end of the can blank which had been previously turned down at an angle of about 120° from its original flat position, to form the initial bend for the side-seam joint. Application is from a roller or by means of a jet of the molten adhesive directed at the folded down end of the can blank. Immediately after application of adhesive, the can blank is formed around a mandrel and the side-seam crimped tight.

It is to be understood that it is intended to cover all changes and modifications of the examples of the invention herein chosen for the purpose of illustration which do not constitute departures from the spirit and scope of the invention.

The invention claimed is:

1. A hot melt adhesive composition, of controlled delayed setting time on cooling from the elevated temperature of application to a surface, the adhesive consisting essentially of an anhydrous combination of a potentially adhesive thermoplastic resinous material, a plasticizer therefor that is a crystalline solid at normal temperatures and is soluble when hot in large proportion in the resinous material and when cold in lesser proportion, and an admixed setting promoter that is an inorganic mineral powder and is chemically inert and insoluble in the combination of resinous material and plasticizer, the proportion of the promoter being 100–200 parts by weight for 100 of the resinous material, the plasticizer being in proportion to dissolve in the resinous material at the elevated temperature of application and in excess of the amount soluble without supercooling in the cooled composition, and the promoter decreasing the delay in separation of the plasticizer from the resinous material during cooling of the composition from the said elevated temperature of application.

2. The composition of claim 1 in which the potentially adhesive material is polyvinyl acetate and the plasticizer therefor is mixed ortho- and para-toluene sulfonamide.

3. The composition of claim 1 in which the potentially adhesive material is a thermoplastic polyamide of a polymerized unsaturated $C_{12}$–$C_{20}$ fatty acid with an aliphatic amine.

4. The composition of claim 1 in which the potentially adhesive material is a cellulose ether.

5. The composition of claim 1 in which the inorganic powder is clay.

References Cited in the file of this patent

UNITED STATES PATENTS

| | | |
|---|---|---|
| 2,613,156 | McGaffin et al. | Oct. 7, 1952 |
| 2,678,284 | Holt | May 11, 1954 |